Figure 1:
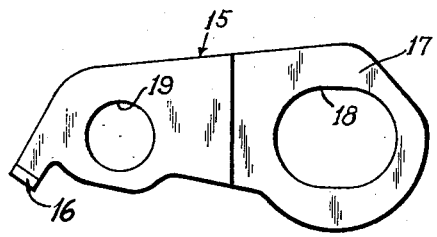

Oct. 12, 1948.   E. V. SCHNEIDER   2,451,304
IDLER SYSTEM FOR PHONOGRAPH TURNTABLE DRIVES
Filed Aug. 23, 1947   3 Sheets-Sheet 1

REISSUED

Inventor
Emmor V. Schneider
By Frease and Bishop
Attorneys

Oct. 12, 1948.  E. V. SCHNEIDER  2,451,304
IDLER SYSTEM FOR PHONOGRAPH TURNTABLE DRIVES
Filed Aug. 23, 1947  3 Sheets-Sheet 3

Inventor
Emmor V. Schneider
By Freear and Bishop
Attorneys

Patented Oct. 12, 1948

2,451,304

UNITED STATES PATENT OFFICE 2,451,304

IDLER SYSTEM FOR PHONOGRAPH TURNTABLE DRIVES

Emmor V. Schneider, Alliance, Ohio, assignor to The Alliance Manufacturing Company, Alliance, Ohio, a corporation of Ohio Application August 23, 1947, Serial No. 770,279

4 Claims. (Cl. 74—206)

The invention relates to drive mechanism for phonograph turntables in which an idler pulley is journalled upon a movable idler plate and held in frictional contact with a drive pulley upon the motor and with a depending rim flange upon the turntable so as to compensate for any eccentricities or out of round condition of the tunrtable flange and provide a constant driving contact therewith.

Turntable drive mechanism of this general type is at present in use, various means having been provided for slidably mounting the idler plate upon the motor mounting plate or other support. Although such devices provide a constant driving contact of the idler pulley with the drive pulley and the turntable rim flange, considerable friction, chatter and vibration of the idler mechanism is developed, which is objectionable in a device of this character.

The object of the present invention is to provide an idler system for phonograph turntable drives which minimizes friction and eliminates chatter and vibration of the idler mechanism.

Another object is to provide such an idler system which is inexpensive to produce and which may be easily and quickly assembled.

A further object is to provide such an idler system in which the idler plate itself is a simple stamping which is flat throughout its length and one end portion of which is carefully sized to close limits.

A still further object is to provide such a device in which the idler plate is supported on a raised area on the motor mounting plate and movably connected thereto by means of a rivet provided with a shoulder held to very close tolerances whereby the sizing of the end portion of the plate and the shoulder of the rivet eliminates excessive clearance variation, thus preventing chatter and sticking of the idler plate.

Another object is to locate the area of the support for the idler plate as close as possible to the drive pulley center in order to minimize friction from the sliding action of the idler plate.

Still another object is to provide such a device in which the rivet which slidably connects the idler plate to the motor mounting plate is hollow so as to receive the motor pulley through the hollow center thereof.

Figure 3:
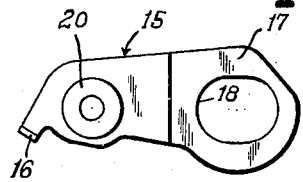
Figure 2:
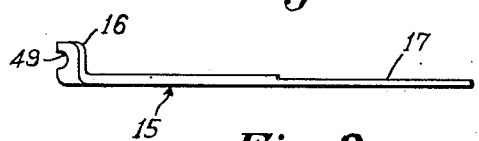
Figure 4:
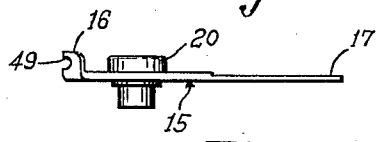
Figure 5:
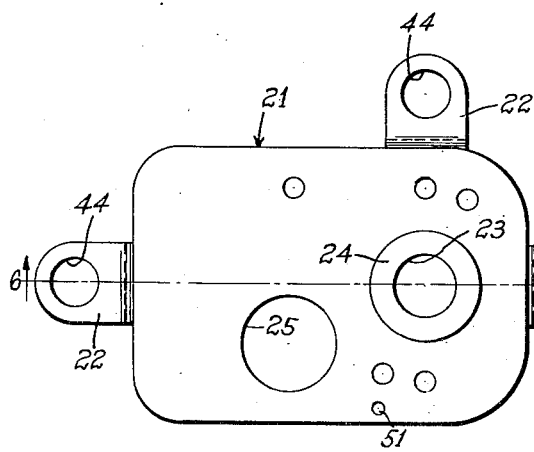
Figure 6:
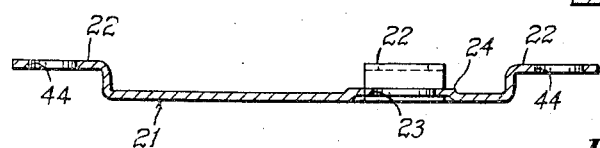

The above objects together with others which will be apparent from the drawings and following description, or which may be later referred to, may be attained by constructing the improved idler mechanism for phonograph turntable drive in the manner hereinafter described in detail and illustrated in the accompanying drawings, in which:

Figure 1 is an enlarged plan view of the improved idler plate forming a part of the invention;

Fig. 2 an edge elevation of the idler plate on the same scale as Fig. 1;

Fig. 3 a full size plan view of the idler plate with the idler pulley bearing assembled thereon;

Fig. 4 a side elevation of the assembly shown in Fig. 3;

Fig. 5 a top plan view of the motor mounting plate;

Fig. 6 a section through the motor mounting plate taken as on the line 6—6, Fig. 5.

Figure 9:
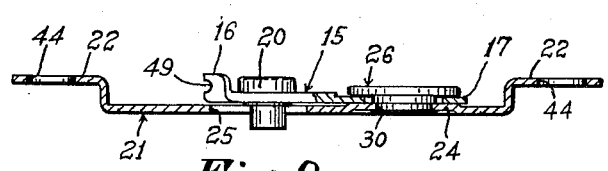
Figure 8:
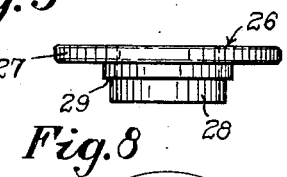
Figure 7:
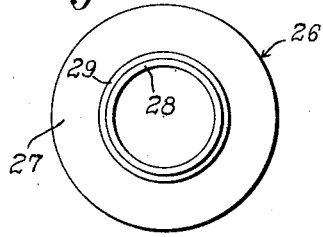
Figure 10:
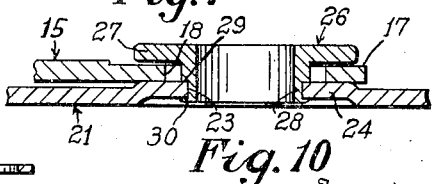
Figure 11:
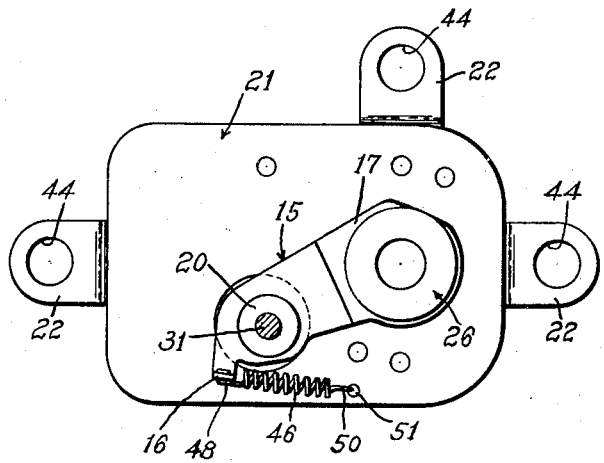
Figure 12:
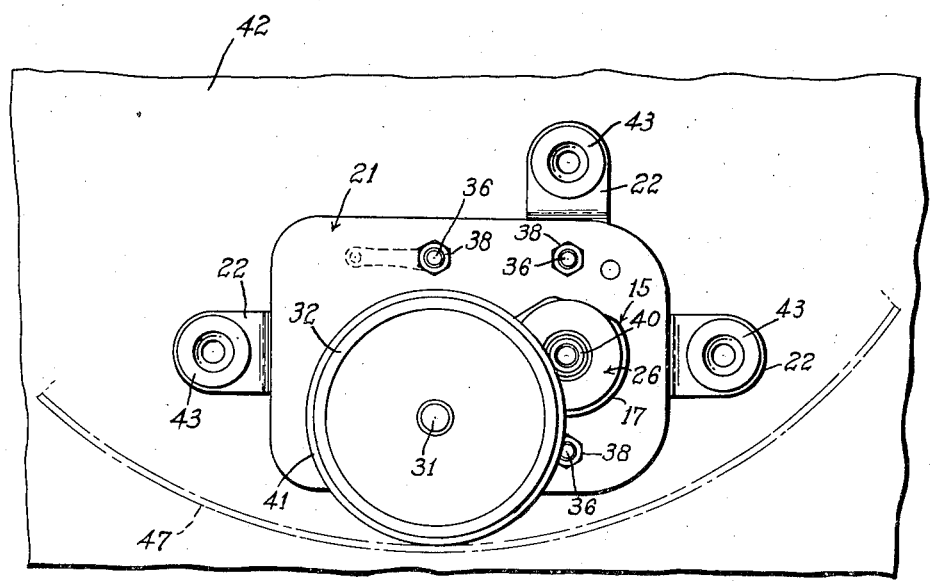
Figure 13:
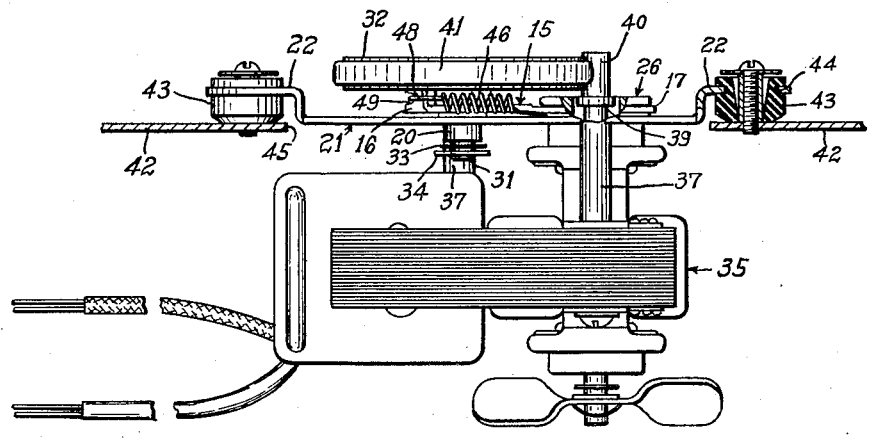
Figure 14:
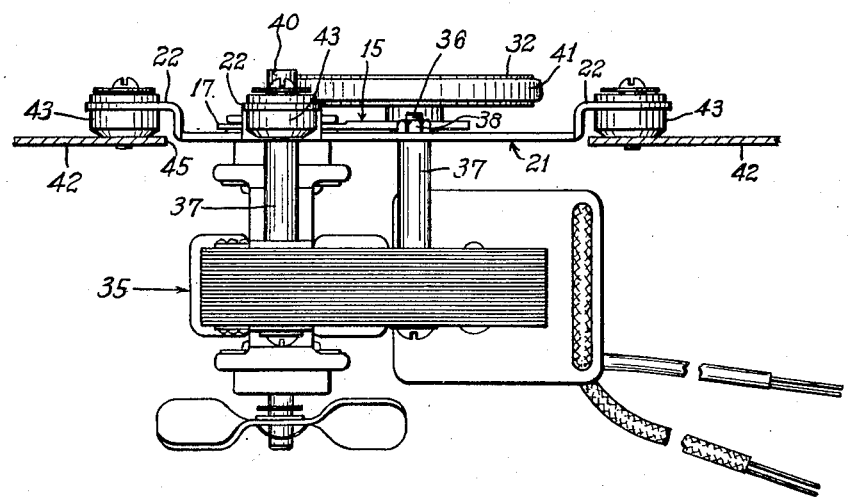

Fig. 7 a bottom plan view of the hollow rivet by means of which the idler plate is slidably supported upon the motor mounting plate;

Fig. 8 a slide elevation of the rivet shown in Fig. 7;

Fig. 9 a longitudinal sectional view through the motor mounting plate with the idler plate supported thereon by means of the hollow rivet;

Fig. 10 an enlarged, detail sectional view through the hollow rivet, showing adjacent portions of the motor mounting plate and idler plate assembled together thereby;

Fig. 11 a plan sectional view of the motor mounting plate and idler plate assembly supported thereon by means of the hollow rivet, the idler pulley being removed for the purpose of illustration;

Fig. 12 a top plan view of a phonograph turntable drive mechanism provided with idler mechanism in accordance with the invention, showing the same mounted in a phonograph;

Fig. 13 a side elevation of a phonograph turntable drive mechanism provided with the improved idler system; and, Fig. 14 a side elevation of the opposite side to that shown in Fig. 13;

The idler plate which forms an important part of the idler system to which the invention pertains is indicated generally at 15 and may be of the general shape best shown in Figs. 1 and 3, being flat throughout its length excepting for the upturned lug 16 at its smaller end.

The wider end portion of the idler plate, indicated at 17 is of less thickness than the remainder of the plate being carefully sized to close limits. The idler plate is smooth and free from any burs, such as are common in the conventional stamped idler plate for this purpose, so as to assure exceptionally smooth action as will be later described in detail.

An elongated or oval opening 18, extending longitudinally of the plate, is formed in the reduced end portion 17 of the idler plate to provide a sliding pivotal mounting of the idler plate as will be later described.

A relatively smaller circular aperture 19 is formed in the other end portion of the idler plate to receive the shouldered idler wheel journal bearing 20 which is inserted through the opening 19 and securely staked.

The motor mounting plate, indicated generally at 21, as shown in Figs. 5 and 6, may be of rectangular shape and provided with the conventional upwardly offset ears 22 for mounting upon the cabinet plate of a phonograph in any usual and well known manner.

A circular opening 23 is formed substantially in the longitudinal center of the motor mounting plate, near one end thereof, and surrounded by the raised area 24, and a circular opening 25 is formed in the motor mounting plate near one side edge thereof and at a point between the raised area 24 and the opposite end of the plate.

In Figs. 7 and 8 is shown a hollow rivet, indicated generally at 26, for slidably pivotally mounting the idler plate 15 upon the motor mounting plate 21. This rivet has the flat head 27 and the hollow shank 28 which is shouldered at 29 and reduced in diameter below said shoulder.

The length of the shank 28 between the shoulder 29 and the bottom of the head 27 is held to a very close tolerance, this distance being just slightly greater than the thickness of the reduced end portion 17 of the idler plate.

As shown in Figs. 9 and 10 the idler plate is assembled upon the motor mounting plate by locating the shank of the rivet 26 through the elongated opening 18 of the idler plate and through the circular opening 23 in the motor mounting plate within which the reduced portion of the shank 28 snugly fits, the shoulder 29 resting upon the top of the raised area 24 of the motor mounting plate and the lower end of the hollow shank being securely staked or riveted over the underside of said raised area, as indicated at 30 in Fig. 10.

The journal bearing 20 upon the idler plate will be located through the circular opening 25 in the motor mounting plate, as shown in Fig. 9, and being of considerably less diameter than said opening permits sliding pivotal movement of the idler plate around the rivet 26.

As shown in Figs. 9 and 10, the only contact between the idler plate and the motor mounting plate will be at the raised area 24 of the motor mounting plate, surrounding the rivet 26, and as the idler plate has a sliding fit between this raised area 24 of the motor mounting plate and the flat head 27 of the rivet, it will be seen that the idler plate may be slidably moved around the rivet with a minimum of friction and without chatter or vibration.

Referring now to Figs. 11 to 14 inclusive, the assembly is completed by journaling the shaft 31 of the idler pulley 32 through the journal bearing 20, a washer 33 and hairpin cotter 34 being provided upon the lower end portion of the shaft, below the journal bearing, to properly retain the idler pulley shaft journalled within the bearing 20.

The motor, indicated generally at 35, may be any conventional type of motor such as is used for this purpose and is suspended from the motor mounting plate in usual manner by means of the bolts 36, spacers 37 and nuts 38.

The motor shaft 39 extends up through the hollow rivet 26 and is provided at its upper end with a drive pulley 40 for frictional contact with the rubber tire 41 upon the idler pulley 32.

The assembly of motor and motor mounting plate, with the idler plate and idler pulley thereon, may be mounted upon the usual cabinet plate 42 of a phonograph by means of any suitable form of rubber grommets 43 located through the openings 44 in the ears 22 of the motor mounting plate 21 so that the motor mounting plate is suspended over the usual opening 45 in the cabinet plate.

A coil spring 46 is provided for sliding the idler plate 15 upon the rivet 26 so as to normally urge the rubber tire 41 of the idler pulley 32 simultaneously into frictional contact with the drive pulley 40 upon the motor and with the rim flange of the turntable indicated in broken lines at 47 in Fig. 12.

One end of the coil spring is provided with a hook 48 which engages in the notch 49 formed in the upturned lug or ear 16 upon the idler plate, the other end of the spring having a hook 50 which is connected to the motor plate 21 as by engaging in the aperture 51 therein.

With this construction of idler system the idler plate is supported upon the motor supporting plate upon the raised area 24 which surrounds the motor pulley 40. Thus the area of support for the idler plate is located as close as possible to the center of the motor pulley in order to minimize friction from the sliding action of the idler plate upon the motor supporting plate.

Since the most of this sliding action is caused by turntable eccentricities and out of round conditions, it will be apparent that such variations in trueness of commercial turntables will cause the idler wheel to roll about the motor pulley as a center.

Thus it is seen that this arrangement of support for the idler plate is most effective since the greatest movement of the idler, with turntable variations, is possible with the least sliding action of the fitted parts.

It will also be evident that the accurately sized or coined portion 17 of the idler plate having no burrs thereon to alter its effective thickness, as in conventional practice, permits exceptionally smooth action which minimizes friction and greatly reduces chatter and vibration.

I claim:

1. In a phonograph turntable drive, a motor mounting plate having an aperture therein, a slightly raised area surrounding said aperture, a turntable provided with a depending annular flange, a motor suspended from the motor mounting plate, a shaft on the motor extending upward through the aperture in the motor mounting plate, a drive pulley upon the upper end of the motor shaft, a hollow rivet located in said aperture, a head on the rivet accurately spaced above said raised area, said shaft being located through said hollow rivet and spaced therefrom, a flat smooth idler plate having a portion accurately sized for a sliding fit between said raised area and the rivet head and slidably pivoted upon the rivet whereby the only contact between the idler plate and the motor mounting plate is at said raised area, an idler pulley journalled upon the idler plate and means for urging the idler pulley into contact with the drive pulley and the turntable flange.

2. In a phonograph turntable drive, a motor mounting plate having an aperture therein, a slightly raised area surrounding said aperture, a turntable, a hollow rivet located through said aperture and having a head accurately spaced above said raised area, a motor suspended from the motor mounting plate, a shaft on the motor located through the center of said hollow rivet, and spaced therefrom, a drive pulley on the upper end of said shaft, a flat smooth idler plate having an elongated opening in one end portion receiving said rivet, said one end portion of the idler plate being accurately sized for a sliding fit between said raised area and said rivet head whereby the idler plate is slidably pivoted upon the motor mounting plate and the only contact between the idler plate and the motor mounting plate is at said raised area, an idler pulley journalled upon said idler plate and means for urging said idler pulley into contact with the drive pulley and the turntable flange.

3. In a phonograph turntable drive, a motor mounting plate having two spaced apertures therein, a slightly raised area surrounding one aperture, a hollow rivet located through said aperture and having a head accurately spaced above said raised area, a motor suspended from the motor mounting plate, a shaft on the motor located through said hollow rivet and spaced therefrom, a drive pulley on the upper end of the shaft, a flat smooth idler plate having an elongated opening on one end portion receiving said rivet, said one end portion of the idler plate being accurately sized for a sliding fit between said raised area and said rivet head, whereby the idler plate is slidably pivoted upon the motor mounting plate and contacts the motor mounting plate only at said raised area, an idler pulley bearing mounted on the idler plate and located through the other aperture in the motor mounting plate, said other aperture being considerably larger than said idler pulley bearing, an idler pulley having a shaft journalled in said bearing, and means for urging the idler pulley into contact with the drive pulley and the turntable flange.

4. In a phonograph turntable drive, a motor mounting plate having an aperture therein, a slightly raised area surrounding said aperture, a turntable provided with a depending annular flange, a motor suspended from the motor mounting plate, a shaft on the motor extending upward through the aperture in the motor mounting plate, a drive pulley upon the upper end of the motor shaft, a hollow rivet located in said aperture, a head on the rivet accurately spaced above said raised area, said shaft being located through said hollow rivet and spaced therefrom, a flat smooth idler plate accurately sized for a sliding fit between said raised area and the rivet head and pivoted upon the rivet, driving means journaled upon the idler plate and means for urging the driving means into driving engagement with the drive pulley and the turntable flange.

EMMOR V. SCHNEIDER.

REFERENCES CITED

The following references are of record in the file of this patent:

UNITED STATES PATENTS

| Number | Name | Date |
| --- | --- | --- |
| 2,261,889 | Schneider | Nov. 4, 1941 |
| 2,272,853 | Schroeder | Feb. 10, 1942 |